United States Patent [19]

Whiteman, Jr.

[11] Patent Number: 4,943,264
[45] Date of Patent: Jul. 24, 1990

[54] CENTRIFUGAL CLUTCH WITH BELT TIGHTENING SPACER ASSEMBLY

[76] Inventor: Marvin E. Whiteman, Jr., 2254 Braniff St., Boise, Id. 83706

[21] Appl. No.: 430,256

[22] Filed: Nov. 2, 1989

Related U.S. Application Data

[63] Continuation-in-part of Ser. No. 371,100, Jun. 26, 1989.

[51] Int. Cl.$^5$ .............................................. F16H 11/06
[52] U.S. Cl. ........................................ 474/13; 474/25; 474/35
[58] Field of Search ..................... 474/11–13, 474/17, 19, 25, 32–35

[56] References Cited

U.S. PATENT DOCUMENTS

| | | | |
|---|---|---|---|
| 2,104,074 | 1/1938 | Erbach | 474/13 X |
| 2,144,443 | 1/1939 | Thomas | 474/13 |
| 2,508,558 | 5/1950 | Wolff | 474/13 X |
| 3,269,200 | 8/1966 | Vaughn et al. | 474/35 |
| 4,743,221 | 5/1988 | Whiteman | 474/13 |

FOREIGN PATENT DOCUMENTS

866550  4/1961  United Kingdom .

*Primary Examiner*—Thuy M. Bui
*Attorney, Agent, or Firm*—Frank J. Dykas; Craig M. Korfanta

[57] ABSTRACT

An automatic variable speed centrifugal clutch with belt tightening assembly is characterized by even transmission of rotational drive to a pair of belts and includes a rotating spindle and clutch plate having an adjustable centrifugally operable belt tightening mechanism. The belt tightening mechanism includes a clutch drum and a spacer which define recesses for receiving the belts to be driven. Slide rails slidably inserted through slide rail holes in the clutch drum and spacer, and connected at their ends to the clutch plate and spindle flange rotationally interlock the clutch assembly yet allow for longitudinal displacement of the clutch drum and spacer means relative to the spindle flange. As the spindle rotates, the clutch drum presses the spacer against a flange of the spindle to evenly drive the belts while compensating for differences in belt size.

12 Claims, 7 Drawing Sheets

CENTRIFUGAL CLUTCH WITH BELT TIGHTENING SPACER ASSEMBLY

CLAIM OF PRIORITY

This is a continuation-in-part of application Ser. No. 07/371,100, filed 06/26/89.

BACKGROUND OF THE INVENTION

1. Technical

Field. The present invention relates to a centrifugal clutch with belt tightening spacer assembly for transmitting power equally through two belts. The assembly is particularly suited for transmitting drive forces to a rotary trowel used for finishing concrete.

2. Background Art

Centrifugally operable clutches, torque converters, and belt tightening devices are well-known in the patented prior art as evidenced by Erbach, U.S. Pat. No. 2,104,074, Wolff, U.S. Pat. No. 2,508,558 and Vaughn, et al., U.S. Pat. No. 3,269,200 and by the British Patent No. 866,550. Although most prior devices are of the single belt type, the Erbach patent discloses an automatic clutch for multiple belt drives. The Erbach clutch includes a floating annular section having V-belts on either side thereof and an axially displaceable annular section which is driven by another V-belt. Rotation of an input shaft causes weights to be displaced radially outwardly to axially displace the annular section against the floating section to take up the slack and drive the belts.

While the prior devices normally operate satisfactorily, they possess certain inherent drawbacks. The Erbach device, for example, requires that one of the belts be in constant contact with the drive mechanism, which results in uneven wear of the belts of the multibelt system. Furthermore, the Erbach clutch requires a constant speed for operation, limiting the applications and versatility of the device.

As described in U.S. Pat. No. 4,743,221, dated May 10, 1988, I recently developed an improved centrifugal clutch belt tightening assembly which provided a variable speed centrifugal clutch belt tightening assembly for transmitting power equally to a plurality of belts. The assembly includes a spindle adapted for rotation about a longitudinal axis having a cylindrical portion and an annular flange portion extending outwardly from one end of the cylindrical portion. A clutch plate is connected with the other end of the spindle cylindrical portion for rotation with the spindle about the longitudinal axis. A belt drive mechanism is mounted on the spindle between the flange portion and the clutch plate. The drive mechanism includes a clutch drum slidably connected with the cylindrical portion and rotatably driven about the longitudinal axis by the clutch plate, at least one spacer freely mounted on the cylindrical portion in spaced relation between the clutch drum and the flange portion for defining annular recesses for receiving the belts, and a plurality of weights arranged between the clutch plate and the clutch drum. As the spindle rotates, the weights move radially outwardly in response to centrifugal force and displace the clutch drum longitudinally toward the spacers and the flange portion to compress the spacers evenly against the belts, whereby the rotation of the spindle is evenly transmitted to the belts to drive the belts at equal speeds.

While the variable speed centrifugal clutch belt tightening assembly described in U.S. Pat. No. 4,743,221 works well, the freely rotating spacer subassembly includes bearing balls retained within spacer grooves notched in the spindle and held in place between the spindle and the spacer by an annular bearing retainer ring attached to the spacer, or a roller bearing assembly, which allows the spacer to freely rotate around the spindle and also to provide for limited travel along the length of the spindle during clutch operation. The fabrication of this spacer subassembly with bearing balls or a roller bearing requires significant additional machining steps during manufacture, and is a relatively difficult subassembly to assemble.

DISCLOSURE OF INVENTION

Accordingly, it is a primary object of the present invention to simplify the spacer bearing subassembly in order to eliminate unnecessary machining steps, simplify fabrication of the subassembly and to improve operation of the clutch assembly. This object is accomplished by elimination of the spacer bearings subassembly, and its substitution with a pair of slide rails which lock the clutch plate, clutch drum, annular spacer and spindle rotationally together, yet allow longitudinal displacement of the clutch drum and the annular spacer.

BEST MODE FOR CARRYING OUT INVENTION

Figure 1:
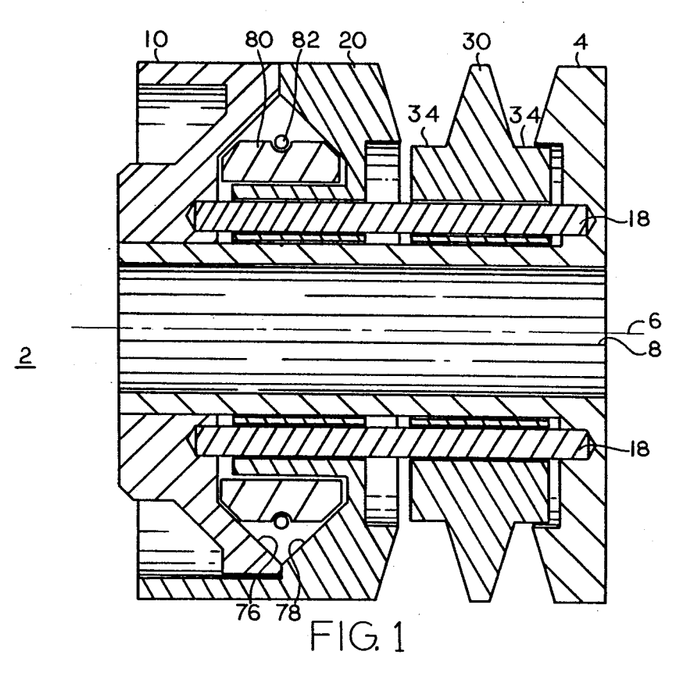
FIG. 1 is a sectional view of the variable speed centrifugal clutch with belt tightening assembly according to the invention.

The variable speed centrifugal clutch with belt tightening assembly according to the invention is shown in this assembled condition in FIG. 1, with the individual components thereof being illustrated in greater detail in the remaining figures. Unless otherwise noted, the individual assembly components are all formed of a rigid material such as aluminum or cast iron.

Figure 2A:
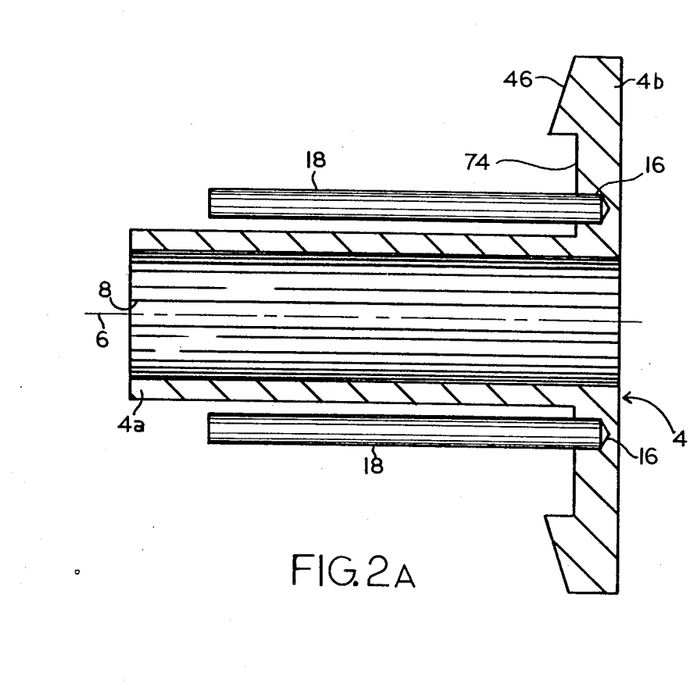
FIGS. 2a and 2b are side and front section views, respectively, of the spindle and slide rails.
Figure 2B:
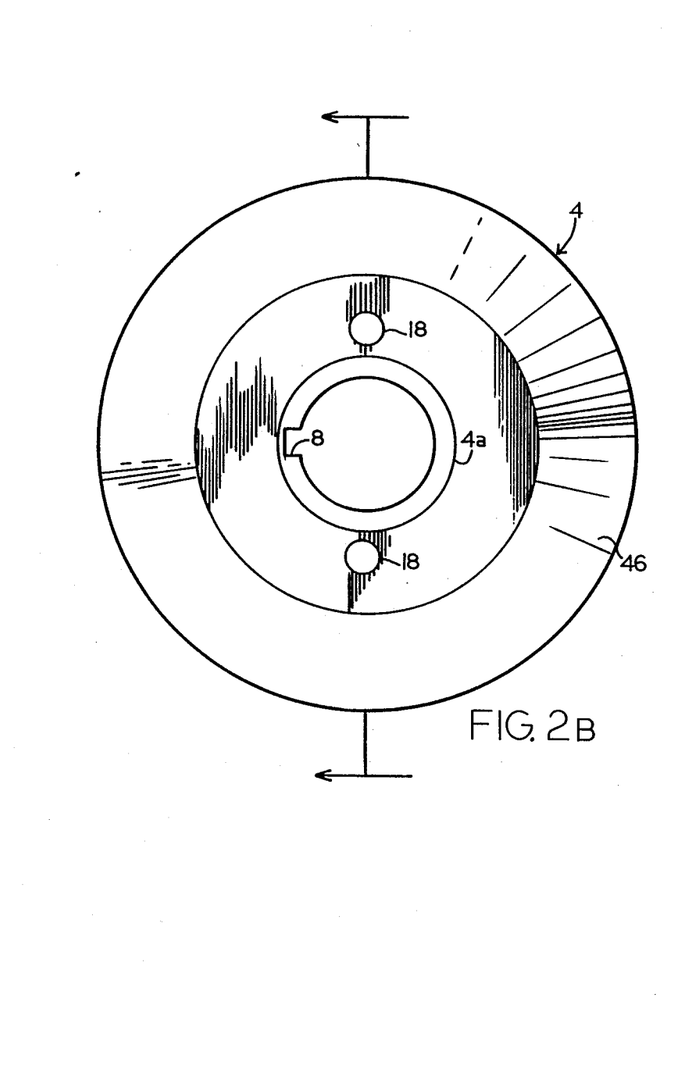

The assembly 2 includes a spindle 4 (shown more particularly in FIGS. 2a and 2b, having a cylindrical portion 4a and a flange portion 4b extending radially outwardly from one end of the cylindrical portion.

The spindle is adapted for mounting on a shaft which is rotated by an engine (not shown) about longitudinal axis 6 with the axis of the spindle cylindrical portion corresponding with the axis of rotation. The inner surface of the spindle cylindrical portion 4a contains a keyway 8 which is adapted to receive a key on the engine shaft, whereby the spindle is rotated with the shaft. Spindle 4 is provided with a pair of slide rail fixing holes 16 adapted to receive and frictionally hold a pair of slide rails 18 which, as later described, rotationally interlock spindle 4 with spacer 30, clutch drum 20 and clutch plate 10.

Figure 6A:
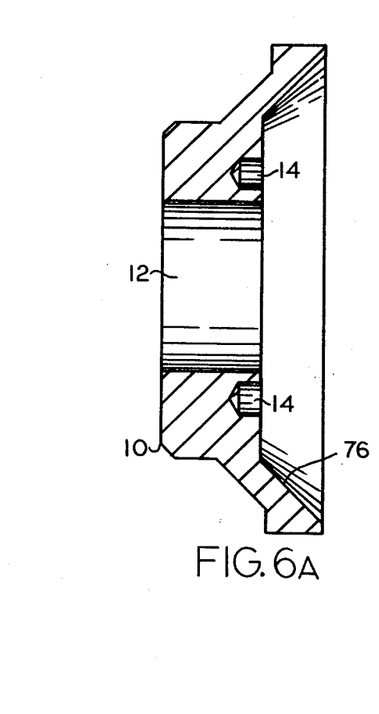
FIGS. 6a and 6b are side and front sectional views of the clutch plate of the assembly.
Figure 6B:
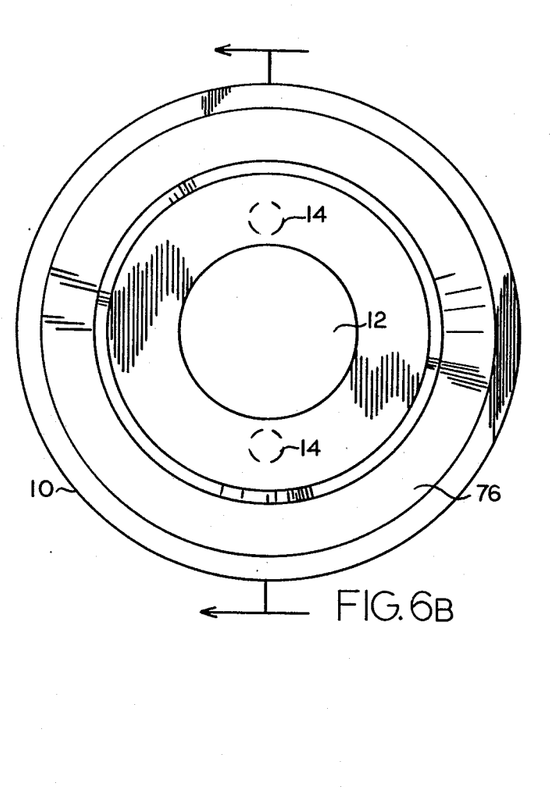

Clutch plate 10 shown more particularly in FIGS. 6a and 6b is mounted on the free end of the spindle cylindrical portion spaced opposite from spindle flange 4b. The clutch plate has a generally annular configuration and contains a central opening 12 having a diameter corresponding with the outer diameter of the spindle cylindrical portion. Clutch plate 10 is also provided with a pair of slide rail receiving holes 14 for receiving and frictionally holding slide rails 18, thus rotationally locking clutch plate 10 to spindle 4 as shown in FIG. 1. Although not shown in the drawings, to reduce torsional forces during operation of clutch assembly 2, the free end of spindle cylindrical portion 4a and the interior surface of clutch plate central opening 12 can be provided with interfitting splines to provide a more positive attachment of clutch plate 10 to spindle 4. The frictional interfitting of slide rails 18 into slide rail receiving holes 14 and slide rail fixing holes 16 also prevents longitudinal displacement of the clutch plate relative to the spindle.

A clutch drum 20 is slidably connected with the spindle cylindrical portion adjacent the clutch plate 10 and between the clutch plate and the spindle flange portion. As shown more particularly in FIGS. 4a and 4b, the clutch drum includes inner and outer spaced cylindrical portions 22 and 24 extending toward the clutch plate. The inner portion 22 has an inner diameter slightly greater than the outer diameter of the spindle cylindrical portion 4a thereby affording longitudinal movement of the drum relative to the spindle. Inner cylindrical portion 22 contains longitudinal slide rail openings 26 which are adapted to slidably receive slide rails 18 which extend through holes 26 as shown in FIG. 1. With such an arrangement, clutch plate 20 is rotated about the longitudinal axis with spindle 4 and clutch plate 10.

Figure 3A:
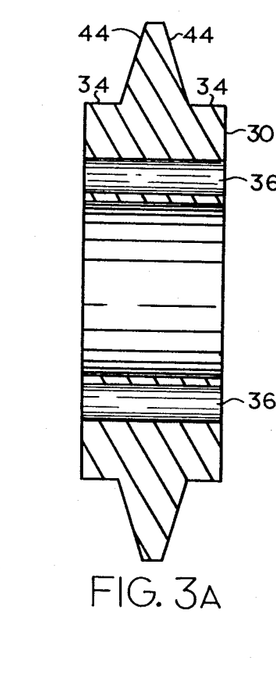
FIGS. 3a and 3b are side and front sectional views, respective the belt runner of the assembly.
Figure 3B:
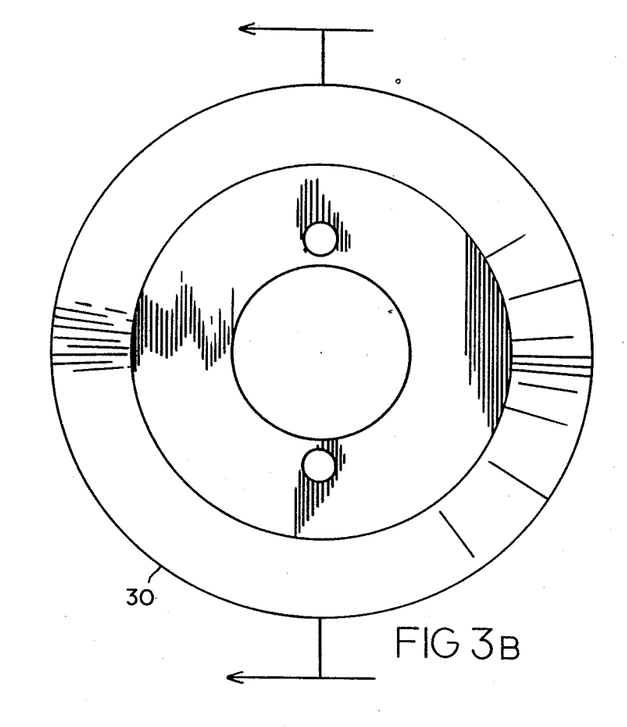

At least one annular floating clutch pulley or spacer 30 is freely mounting for longitudinal travel on spindle cylindrical portion 4a between clutch drum 20 and spindle flange portion 4b. Referring to FIGS. 3a and 3b, the spacer has an annular configuration and contains central opening 32 having a diameter slightly greater than the outer diameter of spindle cylindrical portion 4a. A pair of slide rail spacer holes 36 are provided for slidably receiving slide rails 18 which, as in the case of clutch plate 20, extend through spacer slide rail holes 36 to rotationally lock spacer 30 to clutch assembly 2 as shown in FIG. 1, yet still permit spacer 30 to be displaced longitudinally along spindle cylindrical portion 4a.

Referring once again to FIG. 1, the spacer defines a pair of annular recesses on either side thereof which are adapted to receive two belts (not shown), respectively, which are to be driven by the clutch assembly. Of course, additional spacers may be provided where additional belts are to be driven. The spacer preferably has tapered surfaces 44. Similarly, spindle flange portion 4b has a tapered surface 46 facing the spacer, and clutch drum 20 has a tapered surface 48 facing the spacer. The tapered surfaces thus define tapered recesses for receiving V-belts.

The bottom of each of the tapered recesses is formed by means of annular belt runners 34, which in the preferred embodiment, are formed integral with spacer 30. Annular belt runners 34 are sized to insert and freely rotate within circular recess 64 of clutch drum 20 and circular recess 74 of spindle flange 4b. Another embodiment for the annular belt runners can easily be created using independent belt runners and spacer 30, either attached to or positioned adjacent to spacer 30.

Figure 4A:
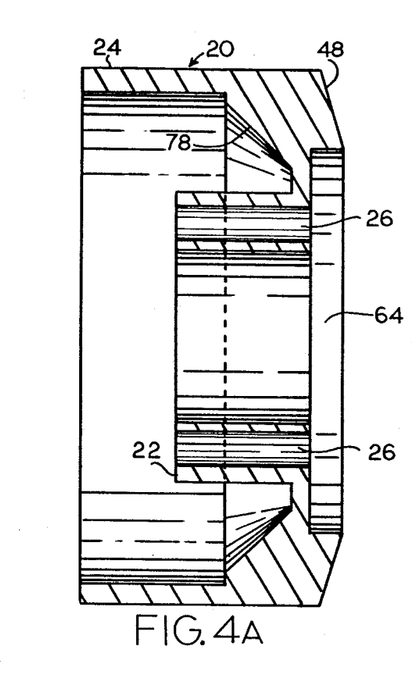
FIGS. 4a and 4b are side and front sectional views, respectively, of the clutch drum of the assembly.
Figure 4B:
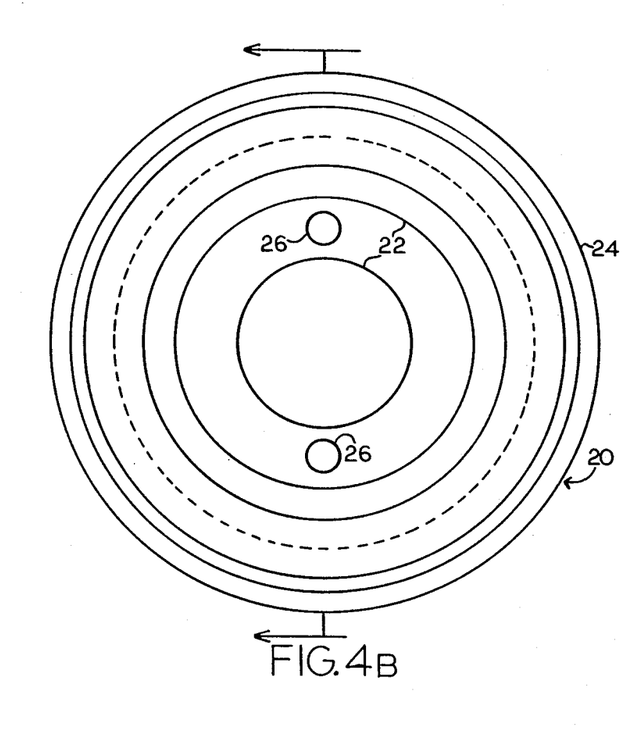
Figure 5A:
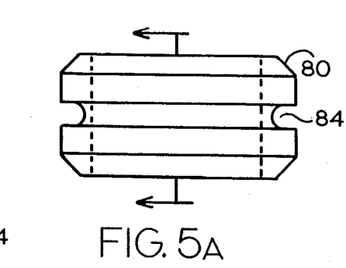
FIGS. 5a, 5b and 5c are top, front and side sectional views, respectively, of a weight of the assembly.
Figures 5B, 5C:
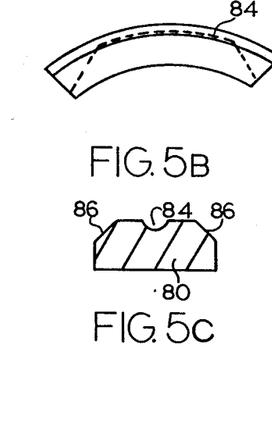
Figure 7:
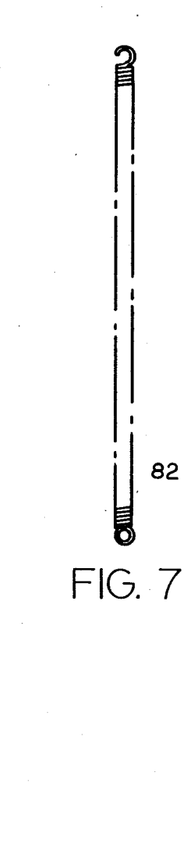
FIG. 7 is a plan view of a weight retainer coil spring.

As shown in FIGS. 1, 4a, and 6a, clutch plate 10 and clutch drum 20 have inclined opposed surfaces 76, 78 respectively, which define with the clutch drum inner cylindrical portion 22 an annular chamber having a generally triangular cross-sectional configuration. Arranged within the chamber are at least two arcuately shaped weights 80 shown more particularly in FIGS. 5a, 5b, and 5c. With the spindle, clutch plate, and clutch drum at rest, the weights 80 are mounted on the clutch drum inner cylindrical portion 22 and retained thereon by a circumferentially arranged coil spring 82 (FIG. 7) which is seated in grooves 84 in the upper surface of the weights 80. As best shown in FIG. 5c, each weight includes inclined surfaces 86 which cooperate with the inclined surfaces 76, 78 of the clutch plate and clutch drum respectively.

In operation, the belts are loosely arranged in the recesses on either side of spacer 30. Upon rotation of the motor shaft, spindle 4, clutch plate 10, clutch drum 20 and spacer 30 rotate together as a unit, with the weights 80 initially resting on the clutch drum inner cylindrical surface. Rotation of the weights generates centrifugal forces against the force of the coil spring 82. The weights move radially outwardly within the chamber as rotational speed increases. The inclined surfaces of the weights press on the inclined surfaces of the clutch plate and clutch drum. Since the clutch plate is fixed relative to the spindle, the clutch drum is longitudinally displaced toward the spacer.

As the clutch drum is displaced toward the spacer, the spacer is similarly displaced toward the spindle flange portion. The V-belts in the recesses are subsequently engaged by the walls of the clutch drum, spacer, and spindle flange portion. The rotational drive transmitted from the spindle is evenly distributed to the belts.

By substituting weights of greater or lesser value, the rotational speed at which the clutch operates may be adjusted. Similarly, the substitution of coil springs of different elasticity may also be used to adjust the operation of the clutch and belt tightening assembly. Furthermore, adjustment of the weights and coil spring enables the clutch to operate off engines having up to 15 horsepower which enables the device to transmit a greater output to the load, such as a rotary trowel. Moreover, the slidable spacer eliminates the need for critical sizing of the belts to be driven since the assembly is self-compensating as to belt thickness. The device is thus capable of automatically evenly driving at least two belts which may be of different sizes or have different degrees of stretch.

Perhaps the most significant improvement provided by the present invention is the elimination of all significant internal mechanism wear part interfaces. With the clutch assembly in a disengaged, idling, configuration or in an engaged, at speed, configuration, there are no clutch parts moving relative to one another. It is only during the transition from an idling, disengaged, configuration to an engaged, at speed, position, are any parts of clutch assembly 2 moving, relative to one another. In practice it has been found that the wear generated by this transition is insignificant and as a result clutch assembly useful life has been dramatically extended.

While in accordance with the provisions of the patent statutes the preferred forms and embodiments of the invention have been illustrated and described, it will be apparent to those skilled in the art that various changes and modifications may be made without deviating from the inventive concepts set forth above.

What is claimed is:

1. A variable speed centrifugal clutch with belt tightening assembly for transmitting power equally to at least a pair of belts, comprising:
   (a) a spindle driven for rotation about a longitudinal axis, said spindle including a hollow cylindrical portion having an axis corresponding with said longitudinal axis and an annular flange portion extending outwardly from one end of said cylindrical portion;
   (b) a clutch plate connected with the other end of said spindle cylindrical portion for rotation therewith;
   (c) means mounted on said spindle between said spindle flange portion and said clutch plate for transmitting rotational drive forces from said spindle to at least a pair of belts, said belt drive transmission means including:
      (1) a clutch drum having a central longitudinal axis coinciding with the spindle longitudinal axis slidably mounted upon said spindle cylindrical portion for longitudinal displacement along said spindle cylindrical portion, said clutch drum further having a slide rail hole formed therethrough at a location displaced from but parallel to the clutch drum longitudinal axis for slidably receiving a slide rail;
      (2) spacer means having a central longitudinal axis coinciding with the spindle longitudinal axis slidably mounted upon said spindle cylindrical portion between the clutch drum and the spindle annular flange portion for longitudinal displacement along said spindle cylindrical portion, said spacer means further having one slide rail hole formed therethrough at a location in alignment with the slide rail hole of the clutch drum for slidably receiving a slide rail;
      (3) a slide rail slidably inserted through the slide rail holes of the clutch drum and spacer means and connected at its ends to the clutch plate and the spindle annular flange so as to rotationally interlock the clutch plate, clutch drum, spacer means and spindle and allow for longitudinal displacement of the clutch drum and spacer means along the spindle cylindrical portion; and
      (4) centrifugal force displacing means for displacing said clutch drum in the longitudinal direction toward said spacer means and said spindle flange portion to compress said spacer means evenly against the belts, whereby the rotation of said spindle is evenly transmitted to the belts to drive the belts at equal speeds.

2. Apparatus as defined in claim 1, wherein said centrifugal force displacing means are adjustable to vary the degree of displacement of said clutch drum relative to the speed of rotation of said spindle.

3. Apparatus as defined in claim 2, wherein said centrifugal force displacing means comprises at least a pair of weights arranged between said clutch plate and said clutch drum, and further wherein said clutch drum and said weights have tapered contiguous surfaces, whereby as said weights move radially outwardly relative to said spindle cylindrical portion in response to the centrifugal force, said weights displacing said clutch drum longitudinally in the direction of said spacer means and said spindle flange portion.

4. Apparatus as defined in claim 3, wherein said centrifugal force displacing means further comprises a spring mounted about said weights for biasing said weights against the centrifugal force.

5. Apparatus as defined in claim 4, wherein said weights have an arcuate configuration for mounting on said spindle cylindrical portion in the recesses defined by said spacer means for supporting the belts arranged within said recesses, said runner means having an outer diameter less than said spacer means.

6. Apparatus as defined in claim 5, wherein said clutch drum, said spacer means, and said spindle flange portion have tapered side walls, thereby forming recesses have a tapered configuration for receiving V-belts.

7. A variable speed centrifugal clutch with belt tightening assembly for transmitting power equally to at least a pair of belts, comprising:
   (a) a spindle driven for rotation about a longitudinal axis, said spindle including a hollow cylindrical portion having an axis corresponding with said longitudinal axis and an annular flange portion extending outwardly from one end of said cylindrical portion;
   (b) a clutch plate connected with the other end of said spindle cylindrical portion for rotation therewith;
   (c) means mounted on said spindle between said spindle flange portion and said clutch plate for transmitting rotational drive forces from said spindle to at least a pair of belts, said belt drive transmission means including
      (1) a clutch drum having a central longitudinal axis coinciding with the spindle longitudinal axis slidably mounted upon said spindle cylindrical portion for longitudinal displacement along said spindle cylindrical portion, said clutch drum further having a plurality of slide rail holes formed therethrough at locations displaced from but parallel to the clutch drum longitudinal axis for slidably receiving a plurality of slide rails;
      (2) spacer means having a central longitudinal axis coinciding with the spindle longitudinal axis slidably mounted upon said spindle cylindrical portion between the clutch drum and the spindle annular flange portion for longitudinal displacement along said spindle cylindrical portion, said spacer means further having a plurality of slide rail holes formed therethrough at locations in alignment with the slide rail holes of the clutch drum for slidably receiving a plurality of slide rails;
      (3) a plurality of slide rails slidably inserted through the slide rail holes of the clutch drum and spacer means and connected at its ends to the clutch plate and the spindle annular flange so as to rotationally interlock the clutch plate, clutch drum, spacer means and spindle and allow for longitudinal displacement of the clutch drum and spacer means along the spindle cylindrical portion; and
      (4) centrifugal force displacing means for displacing said clutch drum in the longitudinal direction toward said spacer means and said spindle flange portion to compress said spacer means evenly against the belts, whereby the rotation of said spindle is evenly transmitted to the belts to drive the belts at equal speeds.

8. Apparatus as defined in claim 7, wherein said centrifugal force displacing means are adjustable to vary the degree of displacement of said clutch drum relative to the speed of rotation of said spindle.

9. Apparatus as defined in claim 8, wherein said centrifugal force displacing means comprises at least a pair of weights arranged between said clutch plate and said clutch drum, and further wherein said clutch drum and said weights have tapered contiguous surfaces, whereby as said weights move radially outwardly relative to said spindle cylindrical portion in response to the centrifugal force, said weights displacing said clutch drum longitudinally in the direction of said spacer means and said spindle flange portion.

10. Apparatus as defined in claim 9, wherein said centrifugal force displacing means further comprises a spring mounted about said weights for biasing said weights against the centrifugal force.

11. Apparatus as defined in claim 10, wherein said weights have an arcuate configuration for mounting on said spindle cylindrical portion in the recesses defined by said spacer means for supporting the belts arranged within said recesses, said runner means having an outer diameter less than said spacer means.

12. Apparatus as defined in claim 11, wherein said clutch drum, said spacer means, and said spindle flange portion have tapered side walls, thereby forming recesses have a tapered configuration for receiving V-belts.

* * * * *